United States Patent
Amiri Modghadam et al.

(10) Patent No.: US 12,287,766 B2
(45) Date of Patent: Apr. 29, 2025

(54) SYSTEMS AND METHODS FOR MACHINE LEARNING-BASED DATA MATCHING AND RECONCILIATION OF INFORMATION

(71) Applicant: JPMORGAN CHASE BANK, N.A., New York, NY (US)

(72) Inventors: Sadra Amiri Modghadam, Mission San Jose, CA (US); Chad Lavy, Delaware, OH (US); Steve Turk, San Mateo, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 217 days.

(21) Appl. No.: 18/047,613

(22) Filed: Oct. 18, 2022

(65) Prior Publication Data

US 2023/0120826 A1    Apr. 20, 2023

Related U.S. Application Data

(60) Provisional application No. 63/256,996, filed on Oct. 18, 2021.

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2255* (2019.01); *G06F 16/25* (2019.01); *G06F 16/27* (2019.01)

(58) Field of Classification Search
CPC .... G06F 16/215; G06F 16/2255; G06F 16/25; G06F 16/27; G06F 16/35; G06F 16/9024; G06N 5/02; G06N 20/00
See application file for complete search history.

(56) References Cited

U.S. PATENT DOCUMENTS 7,269,605 B1 *   9/2007  Nguyen ................ G06Q 10/10
10,489,462 B1 * 11/2019  Rogynskyy ............ H04L 12/14
(Continued)

FOREIGN PATENT DOCUMENTS

WO        2019050968        3/2019

OTHER PUBLICATIONS

International Search Report and Written Opinion of the International Searching Authority, dated Jan. 25, 2023, from corresponding International Application No. PCT/US2022/078317.
(Continued)

*Primary Examiner* — Dinku W Gebresenbet
(74) *Attorney, Agent, or Firm* — GREENBERG TRAURIG LLP

(57) ABSTRACT

A method for machine learning-based data matching and reconciliation may include: ingesting a plurality of records from a plurality of data sources; identifying company associated with each of the plurality of records; assigning a unique identifier to each uniquely identified company; matching each of the records to one of the uniquely identified companies using a trained company matching machine learning engine; identifying a primary company record in the matching records and associating other matching records with the primary company record; matching each of the records to a contact using a trained contact matching machine learning engine; identifying a primary contact record in the matching records and associating other matching records with the primary contact record; synchronizing the plurality of records in a graph database using the unique identifier; receiving feedback on the matching companies and/or matching contacts; and updating the trained company matching machine learning engine.

20 Claims, 5 Drawing Sheets

(51) Int. Cl.
  *G06F 16/22* (2019.01)
  *G06F 16/25* (2019.01)
  *G06F 16/27* (2019.01)

(56) References Cited

U.S. PATENT DOCUMENTS

2020/0233872 A1* 7/2020 Vergo ............... G06Q 10/06393
2020/0327136 A1* 10/2020 Gao ....................... G06Q 10/06

OTHER PUBLICATIONS

Gschwind, Thomas, et al; "Fast Records Linkage for Company Entities", arxiv.org, Cornell University Library, 201 Olin Library Cornell University Ithaca, NY; Jul. 19, 2019.

* cited by examiner

| Description | Notes |
|---|---|
| Pre-approved match (Certified) | Certified match |
| Perfect Name, Perfect Address, Perfect Zip | Very high confidence |
| Perfect Name, Perfect Zip, Perfect URL | Very high confidence |
| Perfect Name, Perfect Zip, Perfect Phone | Very high confidence |
| 90% Name, 90% Address, Perfect Zip | Very high confidence |
| 90% Name, 90% URL, Perfect Zip | Very high confidence |
| 90% Name, 90% Phone, Perfect Zip | Very high confidence |
| 75% Name, Perfect Tax-ID OR Perfect LEI | Very high confidence |
| 75% Name, 85% Address, Perfect Zip | Very high confidence |
| 75% Name, 85% Address, 90% City | Very high confidence |
| 75% Name, 85% Address, Perfect MSA | Very high confidence |
| 75% Name, 1st 8 of Name, Perfect Zip, 90% City, Perfect State, Perfect Tax-id | High confidence |
| 75% Name, 1st 8 of Address, Perfect Zip, 90% City | High confidence |
| 75% Name, Perfect URL | High confidence |
| 90% Name, Perfect Zip | High confidence |
| 90% Name, 90% City, Non-US | High confidence |
| 90% Name, Perfect MSA, 70% City, 70% Address | High confidence |
| Pre-approved match (Uncertified) | 3rd Party provisioned |
| Perfect URL, Perfect Country | Insufficient match |
| 90% Name, Perfect URL | Insufficient match |
| Perfect URL | Insufficient match |
| Perfect Name, Perfect State | Insufficient match |
| Perfect Name, Perfect Country | Insufficient match |
| 90% Name, Perfect State | Insufficient match |
| 90% Name, Perfect Country | Insufficient match |
| Perfect Name | Insufficient match |
| 90% Name | Insufficient match |
| All other | Insufficient match |

FIGURE 4

SYSTEMS AND METHODS FOR MACHINE LEARNING-BASED DATA MATCHING AND RECONCILIATION OF INFORMATION

RELATED APPLICATIONS

This application claims priority to, and the benefit of, U.S. Provisional Patent Application Ser. No. 63/256,996, filed Oct. 18, 2021, the disclosure of which is hereby incorporated, by reference, in its entirety.

BACKGROUND OF THE INVENTION

1. Field of the Invention

Embodiments generally relate to systems and methods for machine learning-based data matching and reconciliation of information.

2. Description of the Related Art

Organizations typically operate on a day-to-day basis as discrete lines of business. These businesses, however, are underpinned by data that is common, related and arguably more valuable in totality than in siloes—specifically the "network value" of the data that is generally not represented or exploited. Data discovery and re-use is often limited across business lines as the benefit for the data "producer" can be seen as limited, but the cost of "sharing" is high.

SUMMARY OF THE INVENTION

Systems and methods for machine learning-based data matching and reconciliation of information are disclosed. According to an embodiment, a method for matching organizations to unique identifiers and managing the unique identifiers may include: (1) ingesting, by a company matching computer program, a plurality of records from a plurality of data sources; (2) identifying, by the company matching computer program, a company associated with each of the plurality of records; (3) assigning, by the company matching computer program, a unique identifier to each uniquely identified company; (4) matching, by the company matching computer program, each of the plurality of records to one of the uniquely identified companies using a trained company matching machine learning engine; (5) identifying, by the company matching computer program, a primary company record in the matching records and associating other matching records with the primary company record; (6) matching, by a contact matching computer program, each of the plurality of records to a contact using a trained contact matching machine learning engine; (7) identifying, by the contact matching computer program, a primary contact record in the matching records and associating other matching records with the primary contact record; (8) synchronizing, by an identity management computer program, the plurality of records in a graph database using the unique identifier; (9) receiving, by the company matching computer program, the contact matching computer program, and/or the identity management computer program, feedback on the matching companies and/or matching contacts; and (10) updating, by the company matching computer program, the trained company matching machine learning engine, or updating, by the contact matching computer program, the trained contact matching machine learning engine.

In one embodiment, the plurality of data sources may include proprietary data sources, structured public data sources, unstructured public data sources, and/or third party data sources.

In one embodiment, the company matching computer program may identify each company based on a company name, a company address, a company identifier, and/or a company uniform resource locator.

In one embodiment, the step of assigning the unique identifier to each uniquely identified company may include: determining, by the company matching computer program, that the uniquely identified company has not been assigned the unique identifier; generating, by the company matching computer program, the unique identifier for the uniquely identified company; and storing, by the company matching computer program, an association between the unique identifier and the uniquely identified company.

In one embodiment, the company matching computer program may match each of the plurality of records to one of the uniquely identified companies using Locality Sensitive Hashing (LSH).

In one embodiment, the company matching computer program may identify the primary company record and/or the primary contact record based on an ownership hierarchy of the record.

In one embodiment, the company matching computer program may identify the primary company record and/or the primary contact record based on a likelihood of matching records from the plurality of sources.

In one embodiment, the method may also include matching, by a property matching computer program, each of the plurality of records to a property using a trained property matching machine learning engine; and identifying, by the contact matching computer program, a primary property record in the matching records and associating other matching records with the primary property record.

According to another embodiment, a method for quality scoring unique identifiers may include: (1) receiving, by a quality scoring computer program, source records from each of a plurality of data sources; (2) scoring, by a quality scoring computer program, each of the source records based on a value of content in the source records, resulting in a first score that indicates whether the source record has valuable information; (3) scoring, by a quality scoring computer program, the source records based on a propensity to match a unique identifier, resulting in a second score that indicates whether the source record is describing a well-known entity; (4) scoring, by the quality scoring computer program, the source records based on direct user feedback, resulting in a third score that indicates whether the source of the record has shown a general level of quality; (5) scoring, by the quality scoring computer program, the unique identifiers based on a number of different data sources attached to each unique identifier, resulting in a fourth score that indicates a reliability of the unique identifier; (6) aggregating, by the quality scoring computer program, the first score, the second score, the third score, and the fourth score; and (7) outputting, by the quality scoring computer program, the aggregated scores.

In one embodiment, the third score may be based on the source record matching a name, an address, and/or a zip code in one of the unique identifiers.

In one embodiment, the method may also include identifying, by the quality scoring computer program, one of the source records with direct feedback that is similar to one of the source records that does not have direct user feedback;

and assigning the source record that does not have direct user feedback with similar user feedback as the identified source record.

In one embodiment, the method may also include assigning, by the quality scoring computer program, a weight to each of the first score, the second score, the third score, and the fourth score based on feedback received on the aggregated scores.

According to another embodiment, a non-transitory computer readable storage medium, may include instructions stored thereon, which when read and executed by one or more computer processors, cause the one or more computer processors to perform steps comprising: ingesting a plurality of records from a plurality of data sources; identifying company associated with each of the plurality of records; assigning a unique identifier to each uniquely identified company; matching each of the plurality of records to one of the uniquely identified companies using a trained company matching machine learning engine; identifying a primary company record in the matching records and associating other matching records with the primary company record; matching each of the plurality of records to a contact using a trained contact matching machine learning engine; identifying a primary contact record in the matching records and associating other matching records with the primary contact record; synchronizing the plurality of records in a graph database using the unique identifier; receiving feedback on the matching companies and/or matching contacts; and updating the trained company matching machine learning engine.

In one embodiment, the plurality of data sources may include proprietary data sources, structured public data sources, unstructured public data sources, and/or third party data sources.

In one embodiment, each company may be identified based on a company name, a company address, a company identifier, and/or a company uniform resource locator.

In one embodiment, the non-transitory computer readable storage medium may also include instructions stored thereon, which when read and executed by one or more computer processors, cause the one or more computer processors to: determine that the uniquely identified company has not been assigned the unique identifier; generate the unique identifier for the uniquely identified company; and store an association between the unique identifier and the uniquely identified company.

In one embodiment, each of the plurality of records may be matched to one of the uniquely identified companies using Locality Sensitive Hashing (LSH).

In one embodiment, the primary company record and/or the primary contact record may be identified based on an ownership hierarchy of the record.

In one embodiment, the primary company record and/or the primary contact record may be identified based on a likelihood of matching records from the plurality of sources.

In one embodiment, the non-transitory computer readable storage medium may also include instructions stored thereon, which when read and executed by one or more computer processors, cause the one or more computer processors to: match each of the plurality of records to a property using a trained property matching machine learning engine; and identify a primary property record in the matching records and associating other matching records with the primary property record.

BRIEF DESCRIPTION OF THE DRAWINGS

For a more complete understanding of the present invention, the objects and advantages thereof, reference is now made to the following descriptions taken in connection with the accompanying drawings in which:

FIG. 4 depicts an exemplary matching scoring scheme according to one embodiment.

DETAILED DESCRIPTION OF PREFERRED EMBODIMENTS

Figure 1:
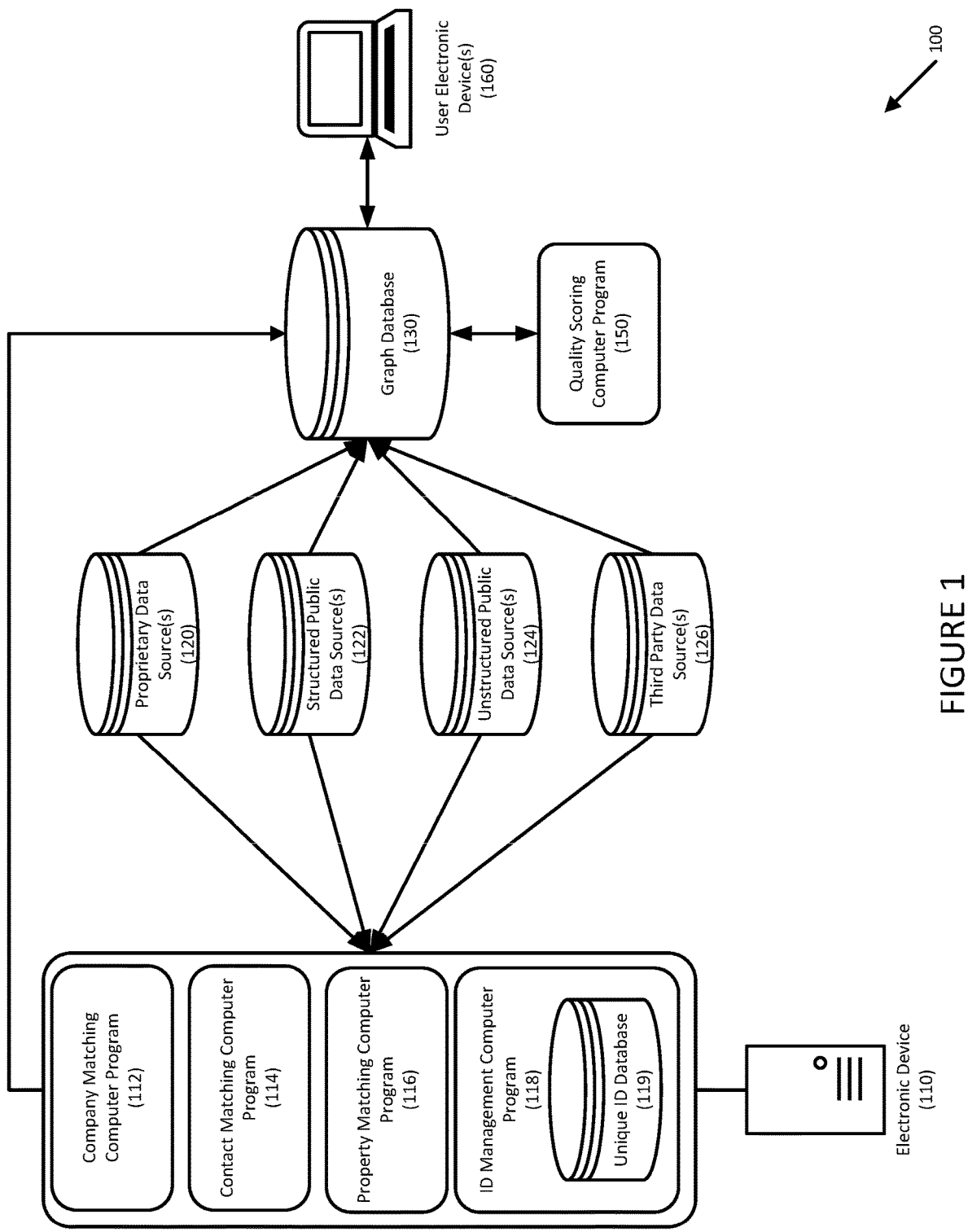
FIG. 1 depicts a system for machine learning-based data matching and reconciliation of information according to an embodiment.

Embodiments are directed to the centralized capture, linkage (both within and between systems), storage, discovery, and access to third party data at scale; specifically relating to companies and individuals. Embodiments give a "common context" to the data. The operating framework enables the lifecycle and data handoffs for a party from initial capture through mastering.

Embodiments may create and manage unique identifiers for the data of entities (e.g., companies and people) and facilitate the capture of the links between these entities, thereby enabling the concept of a common context for the underlying entities, and relationships among them. The common context and relationship graph are both a source of data and a tool to mine and explore the underlying information.

The unique identifiers may be assigned to entities, such as a company (e.g., a Company ID) for clients, potential clients, and non-clients, an individual (e.g., a Contact ID), an investor (e.g., an Investor ID), a property (e.g., a Property ID), etc. that is encountered within internal and external sources of information. Indeed, the matching and feedback process is extensible beyond these manifestations, and is applicable to other areas where entity identification and normalization is a challenge. Further, the unique identifier marks instances of the entity across sources allowing rapid access to all information known about that entity. Absent such an identifier, leveraging multiple sources of information in conjunction requires an ad hoc process to try and match data from one source to the other.

Embodiments may ensure the accuracy of each unique identifier, and may ensure the processes required to formulate unique identifiers across a massive amount of data can be processed in a reasonable amount of time.

An accurate unique identifier may be achieved through a combination of a matching algorithm, the incorporation of feedback, the acquisition of alternative sources of matches, and a process that blends these components into a final result.

Matching algorithms may use different permutations of a variety of firmographic attributes to identify instances of entities across all the data sources. The matching algorithm may honor pre-approved matches based on feedback that has been gathered. It may also use, as necessary, sources of likely matches from other sources such as the vendors themselves.

Prior to using the matching algorithm across sources, the matching algorithm may be applied within the sources to identify intra-source duplication; a major source of data quality issues when trying to form an accurate identity across sources. When duplicates are found within a data source, a primary record may be chosen and then the subordinate records may be bound to the primary record from an inter-source matching perspective. The primary record may be chosen by evaluating the ownership hierarchy of the record, if available, and then by looking at a likelihood of a primary record candidate to match other sources relative to the likelihood of subordinate record candidates.

To expedite the matching process, instead of using brute force to check all the potential matches, embodiments may use Locality Sensitive Hashing (LSH). LSH is an approximate algorithm that hashes the potential matches into the same bucket with high probability, and then a brute force algorithm may check all the records within a same bucket and may refine the final matches. Since LSH is an approximate algorithm, it is possible to miss some of the true matches after each run. Thus, a memory mechanism may be used to ensure that over time almost all the true matches are captured.

In one embodiment, each run may be a complete/fresh run trying to find all the potential matches. Given the probabilistic nature of the matching algorithm, it is possible to miss a few of them in one run. To minimize the possibility of pre-identified good matches from the previous runs being missed over time, the new matches may be combined with the pre-identified matches, and only the best matches for each unique identifier may be kept. Adding the memory mechanism guarantees that over time identified good matches will not be lost, and the quality of matches will improve after each run.

In embodiments, similarity may be defined based on a set of rules using company names, address, Uniform Resource Locator (URL), phone, taxid, Legal Entity Identifier (LEI), etc. The hash functions may be defined based on those rules. To reduce the run time and make it scalable, embodiments may implement the full pipeline in, for example, SPARK and run in, for example, a HADOOP cluster. Other implementations may be used as is necessary and/or desired.

Using unique identifiers, embodiments may create as complete representation as possible of each entity, and may also construct a network of connections between entities.

For each entity (company, contact, investor, etc.), embodiments may rank each source of information based on the confidence in that source of information, and may then use waterfall or similar logic to fill out the most complete, conformed, record for the entity. Sources of information may include applications, vendors, web crawling algorithms, employees of the firm, etc. At cold start, higher confidence values may be assigned to sources that have a component of recency (recently updated equals higher confidence) as well as robustness (more attributes about entity filled out equals higher confidence). Confidence in the source of information, however, may be dynamic and may evolve as additional input is collected through a feedback process (e.g., users correcting specific pieces of information may result in a lower confidence in the source, or agreeing with it may result in a higher confidence in the source, etc.). In embodiments, each source's version of the information may be provided for transparency and to foster feedback.

Embodiments may provide the entity information and unique identifiers to a graph database, wherein the connections between entities may be rendered for navigation and understanding. The unique identifiers may be considered to be the lattice work that acts as the means to access each source of information that may contain information about a connection. Thus, the unique identifiers may be used to identify a network of available data about each entity, and that network may be used to identify connections between entities (e.g., companies to companies, companies to people, people to people, etc.). Placing these components into a graph database makes navigation of these networks possible.

Embodiments may provide a shared data access platform. Embodiments provide a mechanism for identifying, describing, linking/relating, and accessing the specific data assets it contains. Embodiments facilitate the joining of data sourced from multiple points of origin to allow for richer insight discovery and a broader and deeper understanding of the data, including clients, potential clients, etc. Embodiments provide a scalable solution for the sourcing, storage and access of the third-party datasets that exist relating to these companies, and which historically have been captured only "as required" but never brought together, or represented in a graph like way.

Embodiments facilitate the centralized capture and storage of data, and meta-data associated with these entities, creating the potential for a higher fidelity 360-degree view of the company.

Embodiments may include the following components:

1. Core: a creation, allocation and operating model for unique identifiers for the entities. These unique identifiers represent the "Rosetta stone"—the ability to link related records across domains. The core may further include: (a) extensible and saleable intake and storage: this may leverage a cloud technology stack; (b) matching and concordance: the portfolio of tools/models used to map a given record to the unique identifier and to manage the lifecycle of this data which needs to evolve with changes in the underlying company. This data is complex to source, and benefits from a "crowd-sourcing" model; (c) meta-data: the associated meta-data required to define and represent the data entity. This may be limited to necessary data so that this is not a data lake by proxy; (d) storage: the persistence of this data, critically supporting bi-temporal style retrieval patterns; (e) entitlements: ensuring this data is appropriately controlled, and that these entitlements are consistent and pervasive through the various components; and (f) discovery: cataloguing and lineage; both in terms of data elements, but also operational accountability and data ownership.

2. Graph: a representation and associated technology to relate the entities defined in "core" to one another, and add relevant information to these relationships (e.g., Bill Gates is the [chairman] of Microsoft).

3. API and access: patterns and tools to enable data access both for system-system patterns, but crucially for user-system usage; explicitly supporting analytic style queries (meaning those requiring large datasets, or highly varied queries).

4. Operational support and quality: as the user based becomes larger, and the use cases increasingly critical, the operational support for the data becomes a key element of the platform. This component provides both the ongoing data monitoring and quality assurance, but also the route for support and escalation where issues arise.

5. Extensible data domains: enable scaling and adaptation to growth in data assets. (e.g., Company, Contact, Investor, Real Estate Properties), and a lightweight way of forming edges/relationships between entities.

Embodiments may use a tiered adoption model, with the bottom tier being seen as "mandatory" for datasets fitting a given criteria (namely that this data uses a company or individual identifier as a primary key, is captured, duplicated or has direct consumption in >1 team). The tiers may include:

"Bronze"—data is modelled with an additional unique ID. Enables cross dataset linkage, with explicit data federation. Embodiments may pull fact data to enable easier analytic/aggregation, however, ADS remains with source.

"Silver"—IDs modelled, and source system provides "push" of fact data into store to leverage discovery/analysis and consumption from single source.

"Gold"—IDs modeled, and data fed in "near time" into the system—data has firmwide relevance, or material value when co-located with existing datasets.

Embodiments provide a joint delivery model for enabling data products within the platform, based on a joint team and single backlog. This covers the on-boarding of data, and development activity needed to support the specific use cases.

Embodiments may establish a defined set of roles and responsibilities, across the domains would be a logical next step in creating a governance model for each of the components. In doing so, this operating model may embed and support the relevant domain data architecture principles.

Embodiments may provide a single distributed network that provides effective and transparent governance to drive roadmap and investments in additional capacity/capability, and to ensure effective operation of the contribution and outreach model.

Embodiments may provide at least some of the following benefits:
  Consistent context lowers the effort to accumulate insight, and should accelerate delivery, especially in federated environment with multiple contributors.
  Shared intelligence: by tagging data with a consistent unique ID, data may be re-used across teams, lines of business, etc. Embodiments may provide a mechanism by which query and discovery can propagate throughout data products without requiring direct integration. This allows querying across previously disparate datasets, without needing directly move data.
  Provides for a more easily accessible "single version of the truth" but lowering the risk of data duplication/non discovery.
  Opportunity to minimize functional (and technology) duplication across domains—shared requirements risk non delivery in siloes due to each domain carrying the full delivery overhead, shared usage will reduce the incremental cost for functional or data delivery.
  Reduced operational effort to onboard and access data: Embodiments may reduce the duplication of data sourcing, linkage, storage and retrieval patterns.
  Consistency of access patterns and improved re-use: by enabling a consistent set of access patterns, combined with a contribution model for data and data corrections, there may be greater leverage of the data investments made, and increased ability to share, extend and adapt associated analytics—critically linking across domains through the shared ID.
  Enables incremental data discovery—by exploiting the perpetually growing/enrichment of data, analytic models should be able to incrementally learn/correct/enrich. For example, embodiments can predict more/with greater accuracy as the underlying data is improved through the collective/crowd-based sourcing.

In embodiments, embodiments may use the following attributes to match companies: Company Name, Address, City, Country, LEI, MSA, Phone, TaxID, State, URL, and Zip. Other attributes may be used as is necessary and/or desired.

The matching process may include the following:
1. Certified matches are matches that have been approved by the organization. These matches override anything matched via the algorithm.
2. The matching algorithm may match each source to each other source and based on combinations of matching attributes and their relative match strength, assigns a keep score from 0-25. Only 0-15 is considered a quality match.
3. Uncertified matches are matches that are provided by third parties but have not been reviewed for quality. These matches are used as a catch-all for groupings that were not formed by certified matches or the algorithm.

The unique identifiers may be managed to ensure that the same unique identifier will be assigned to a consistently grouped output of matching run-over-run. Embodiments may manage rules for group splits and group merges to favor the presence of ECIs, the respective "mass" of the groupings, and favored third party presence. Embodiments may generate new unique identifier accordingly.

FIG. 1 depicts an illustration of a system for machine learning-based data matching and reconciliation of information. System 100 may include electronic device 110 that may execute one or more computer programs, including company matching computer program 112, contact matching computer program 114, property matching computer program 116, and ID management computer program 118. Electronic device 110 may be any suitable electronic device, including servers (e.g., cloud-based and/or physical servers), computers (e.g., workstations, desktops, laptops, notebooks, tablets, etc.), smart devices, kiosks, etc.

Computer programs 112, 114, and 116 may include trained machine-learning algorithms that may be trained to match companies, contacts (e.g., individuals), or properties (e.g., real property), respectively. Computer programs 112, 114, and 116 may be trained using a first portion of historical training data, and may also be validated using a second portion of historical training data.

Computer programs 112, 114, and 116 may interface with a plurality of data sources, including, for example, proprietary data sources 120, structured public data sources 122, unstructured public data sources 124, third party data sources 126, etc. Other and/or different data sources may be provided as is necessary and/or desired. The records provided by data sources 120, 122, 124, and/or 126 may be related to a company and/or a contact, including, for example, include transaction records, communication records, product transaction records, balances, news, social media events, changes in relationships (e.g., employment/supply chain), etc.

For example, proprietary data sources 120 may provide records that may be proprietary to an organization. Examples of records provided by propriety data source 120 may include client and prospect records, client product transactions, counterparty identities, customer relationship management (CRM) accounts, etc.

Structured public data sources 122 may provide public records that have a structured format. Examples of such public records include Fortune 500 lists, public registries, etc.

Unstructured public data sources 124 may provide public records that are in an unstructured format. Examples of such records include social media feeds, government filings, company websites, etc.

Third party data sources 126 may provide records from third parties. Examples of such records include datasets provided about companies and individuals from third parties.

Computer programs 112, 114, and 116 may match instances within the records received from data sources 120, 122, 124, and 126, with company matching computer program 112 matching companies, contact matching computer program 114 matching contacts, and property matching computer program 116 matching properties. In one embodiment, records from data sources 120, 122, 124, 126 may be pre-processed to identify intra-source duplication (i.e., duplicates within one of data sources 120, 122, 124, or 126), which may be a source of data quality issues when trying to form an accurate identity across sources. When duplicates are found within a data source, a primary record may be selected and then the subordinate records may be bound to the primary record from an inter-source matching perspective.

Once pre-processing and de-duplication is completed, company matching computer program 112, contact matching computer program 114, and/or property matching computer program 116 may use different permutations of a variety of firmographic attributes to identify instances (e.g., companies, contacts, etc.) of entities across all the data sources. A primary record for each instance may be chosen based on the ownership hierarchy of the record, if available, and by looking at a likelihood of a primary record candidate to match other sources relative to the likelihood of subordinate record candidates. To expedite the matching process, Locality Sensitive Hashing (LSH) may be used. LSH is an approximate algorithm that hashes the potential matches into the same bucket with high probability, and then a brute force algorithm may check all the records within a same bucket and may refine the final matches. Since LSH is an approximate algorithm, it is possible to miss some of the true matches after each run. Thus, a memory mechanism may be used to ensure that over time almost all the true matches are captured.

Each run may be a complete/fresh run trying to find all the potential matches. Given the probabilistic nature of the matching algorithm, it is possible to miss few of them in one run. To minimize the possibility of pre-identified good matches from the previous runs being missed over time, the new matches may be combined with the pre-identified matches, and only the best matches for each unique identifier may be kept. The memory mechanism may ensure that, over time identified, good matches are not lost, and the quality of matches will improve after each run.

Similarity may be defined based on a set of rules using company names, address, URL, phone, taxid, LEI, etc. The hash functions may be defined based on those rules. To reduce the run time and make it scalable, pipeline is implemented using SPARK and runs in a HADOOP cluster. Other implementations may be used as is necessary and/or desired.

In one embodiment, company matching may be performed first, followed by contract matching, and then by property matching. For contacts (i.e., people), it can be challenging to verify that two people with similar names are, indeed, the same person when an additional identifier, such as a tax id, is not available. Additionally, the names of individuals provided by our sources are not standardized (e.g., Bob versus Robert). By matching companies first and then matching contact records together within the context of a company, embodiments may limit the limited initial scope of the matching process and can more reliably pair a contact record from one source with a contact record from another source that have similar identifying characteristics.

Once contact matching is established within the scope of a given company, in embodiments, contact matching computer 114 program may use third party contact keys and machine learning techniques to match contacts across companies.

For properties, embodiments may use address information from companies and business addresses from contacts to boost our identification of property locations and the relationship of properties to companies and individuals.

Each unique identifier may create as complete representation as possible of each entity, and constructs a network of connections between entities. Company matching computer program 112, contact matching computer program 114, and/or property matching computer program 116 may honor pre-approved matches based on human observed/confirmed feedback that has been gathered to override and to improve the algorithm used by matching computer program 112, contact matching computer program 114, and/or property matching computer program 116.

ID management computer program 118 may use the outputs of one or more of matching computer program 112, contact matching computer program 114, and property matching computer program 116 and may store unique identifiers in unique ID database 119. Unique ID database 119 may be provided in the cloud, in local storage, etc. ID management computer program 118 may manage the use of the unique identifiers by graph database 130.

Data from data sources 120, 122, 124, 126 may also be provided to graph database 130. For example, unique ID database 119 may provide a cross-reference to all sources that contribute records to an entity (e.g., company, contact, and/or property). A data transformation process takes the records from each of data sources 120, 122, 124, 126 and may conform records into standardized values such as name, address, number of employees, etc. The transformation process may also identify relationships among the records such as a contact works for company, a first company supplies a second company, etc.

In one embodiment, the outputs of the company matching computer program 112 and the contact matching computer program 114 may be used to populate graph entities (and the attributes of those entities) and graph relationships (and the attributes of those relationships).

ID management computer program 118 may synchronize data in graph database 130 with the unique identifiers. As records are ingested, groupings may split, merge, exit, etc. ID management computer program 118 may ensure that a given entity is consistently assigned the same unique identifier run over run. It also ensures that an identifier is never reused for an entity that was previously meant to identify a different entity.

In the cases of splits and merges, specific rules may be applied to determine which groupings get to keep an incumbent identifier (splits) and which identifiers survive or are destroyed (merges).

Quality scoring computer program 150 may be a computer program that may be executed by an electronic device, in the cloud, etc. that may assess the quality of the data in graph database 130. The quality may be rated on multiple levels. For example, company and contact groupings may be rated as more reliable based on the number of "matched" independent sources that provide consistent company firmographics and attribute values. Conversely, company and contact groupings may be rated as less reliable when fewer sources are included in a grouping or the attribute values are inconsistent.

Scoring may incorporate the observed reliability of specific data sources when judging the overall quality of the matched grouping. For example, individual source records may be scored based on how well they are populated with the information required by company matching computer program 112 and/or contact matching computer program 114. In addition, some sources may be selected based on the incremental data content that it provides and may be scored based on how well it satisfies their expected value proposition.

Data sources 120, 122, 124, and/or 126 may be acquired for a specific reason, such as providing a specific type of data (e.g., merger and acquisition data). When evaluating a record from a given source, the source may be scored based on how well it satisfies the criteria for which it was intended. For example, a mergers and acquisitions source may be scored based on whether it provides merger information.

Quality scoring computer program 150 may incorporate feedback from user electronic devices 160 to improve quality scoring computer program 150. As users interact with the data in graph database 130, they may be presented an interface on their user electronic devices 160 that enable the users to provide, for example, three types of feedback: 1) matching program results, 2) conformed attribute value assignments, and 3) reliability of the individual data sources providing values. The user feedback may be incorporated into company matching computer program 112, contact matching computer program 114, and/or property matching computer program 116 to improve matching algorithm where applicable.

The feedback may also be used to confirm the outputs of company matching computer program 112, client matching computer program 114, and/or property matching computer program 116, thereby effectively mastering the matches going forward so that transient input data cannot split them apart. Users may also verify the accuracy or report the inaccuracy of conformed company, contact, and/or property attributes (e.g., company sales size). Once verified, this feedback may be incorporated into graph database 130. Users may also identify which data sources 120, 122, 124, and/or 126 tend to provide the best values for specific attributes of specific companies and contacts, which may then be used to improve company matching computer program 112 and/or contact matching computer program 114.

Figure 2:
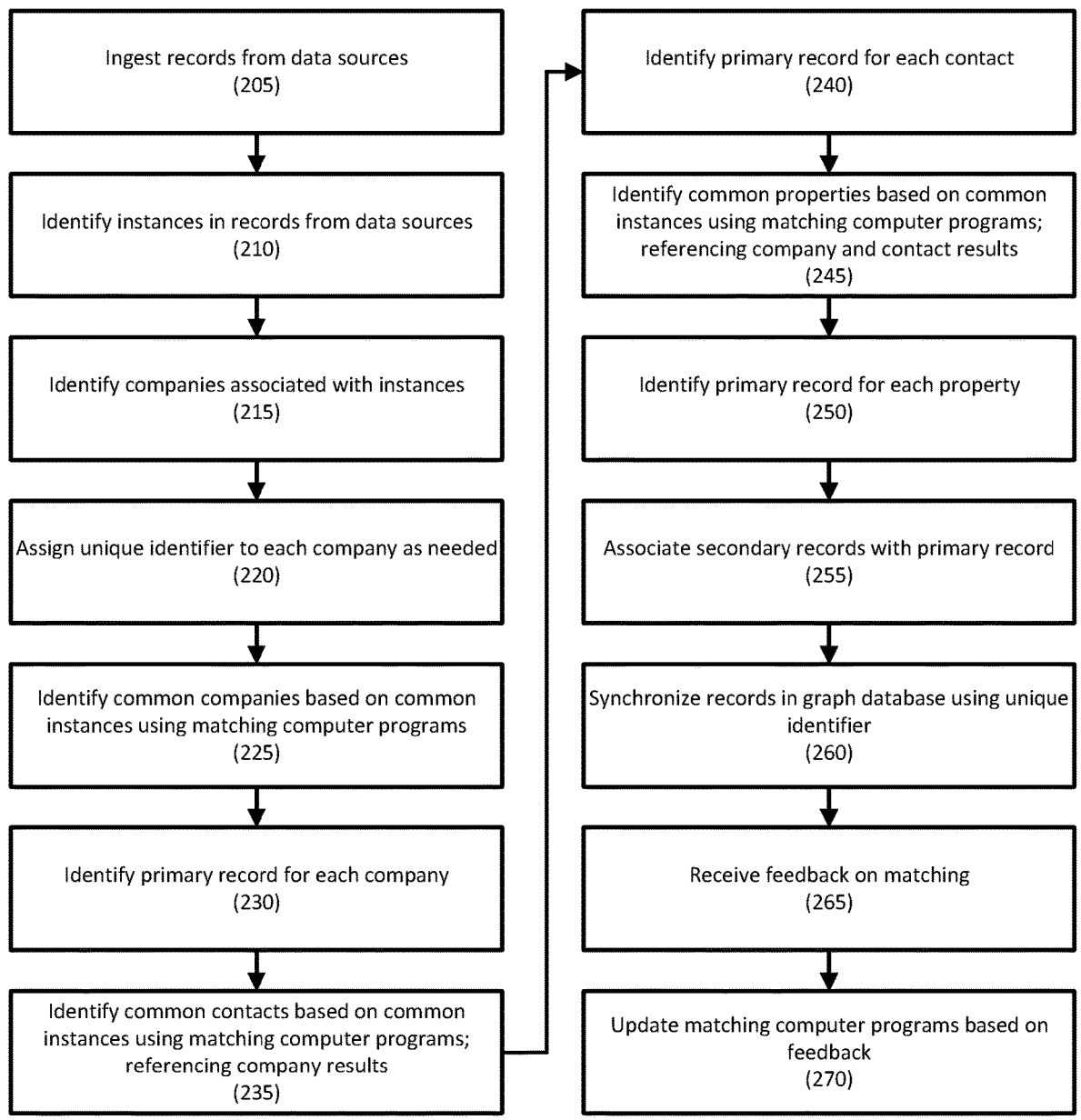
FIG. 2 depicts a method for machine learning-based data matching and reconciliation of information according to an embodiment.

Referring to FIG. 2, a method for matching organizations to unique identifiers and managing unique identifiers is provided according to embodiments.

In step 205, a computer program, such as a company matching computer program, may ingest records from a plurality of data sources, such as proprietary data sources, structured public data sources, unstructured public data sources, third party data sources, etc.

In step 210, the computer program may identify instances in records from data sources. For example, the computer program may identify a name, an address, an identifier (e.g., a LEI, a tax ID, etc.), a URL, etc., in the records.

In step 215, the computer program may identify companies associated with instances. For example, the computer program may identify a company based on the name, address, identifier, URL, etc.

In step 220, the computer program may assign a unique identifier to each identified company as needed. For example, the computer program may determine whether the identified company has an existing unique identifier by checking a unique identifier database. If a unique identifier has not been assigned, the computer program may generate and assign the unique identifier for the identified company, and may store the association between the unique identifier and the company in the unique identifier database.

In step 225, the computer program may identify common companies based on common instances using matching computer programs and may group the common companies into groups. For example, the computer program may review the ingested records and identify common companies. To expedite the matching process, Locality Sensitive Hashing (LSH) may be is used. LSH is an approximate algorithm that hashes the potential matches into the same bucket with high probability, and then a brute force algorithm may check all the records within a same bucket and may refine the final matches. Since LSH is an approximate algorithm, it is possible to miss some of the true matches after each run. Thus, a memory mechanism may be used to ensure that over time almost all the true matches are captured.

In step 230, the computer program may identify a primary record for each company. In one embodiment, the primary record may be chosen based on the ownership hierarchy of the record, if available, and by looking at a likelihood of a primary record candidate to match other sources relative to the likelihood of subordinate record candidates.

In step 235, a second computer program, such as a contact matching computer program, may identify common contacts in the records based on common contact instances. For example, the contact matching computer program may identify names of individuals in the records, and may then associate the individuals with the company in the record.

In one embodiment, the contact may also be assigned a unique identifier as needed.

In step 240, the contact matching computer program may identify a primary record for each contact. In one embodiment, the primary record may be chosen based on the ownership hierarchy of the record, if available, and by looking at a likelihood of a primary record candidate to match other sources relative to the likelihood of subordinate record candidates.

In step 245, a third computer program, such as a property matching computer program, may identify common properties based on common property instances in the records.

For example, the property matching computer program may identify property addresses for properties, and may then associate the properties with the company and/or contact in the record.

In one embodiment, the property may also be assigned a unique identifier as needed.

In step 250, the property matching computer program may identify a primary record for each property. In one embodiment, the primary record may be chosen based on the ownership hierarchy of the record, if available, and by looking at a likelihood of a primary record candidate to match other sources relative to the likelihood of subordinate record candidates. The accuracy may be based on a completeness of a record, a match to a property address, identifier, etc.

In step 255, the property matching computer program may associate secondary records with primary record.

In step 260, an ID management computer program may synchronize records in a graph database using the unique identifiers. For example, the ID management computer program may update records in the graph database with the unique identifiers and primary/secondary records. The graph database may use the unique identifier and primary/secondary records to identify connections between companies, contacts, and/or properties, and may persist those relationships as needed.

In step 265, the ID management computer program or any of the matching computer programs may receive feedback on the accuracy of the matching. The feedback may be received from a data consumer, and may be positive or negative feedback. For example, the feedback may identify an incorrect company, contact, or property association, may update an address, may identify unique identifiers that should be merged or split, etc.

In step 270, the matching computer programs may be updated based on the feedback. For example, the matching computer programs may be re-trained based on the feedback. Machine Learning algorithms are taught to arrive at a correct answer by providing them with a "truth set" that allows them to calibrate their decision making against sample populations. Feedback essentially provides an enhanced truth set that can be used to retrain the models to make even better decisions. Retraining can take place at any time it is deemed valuable to do so, such as when material patterns emerging from feedback are identified.

Figure 3:
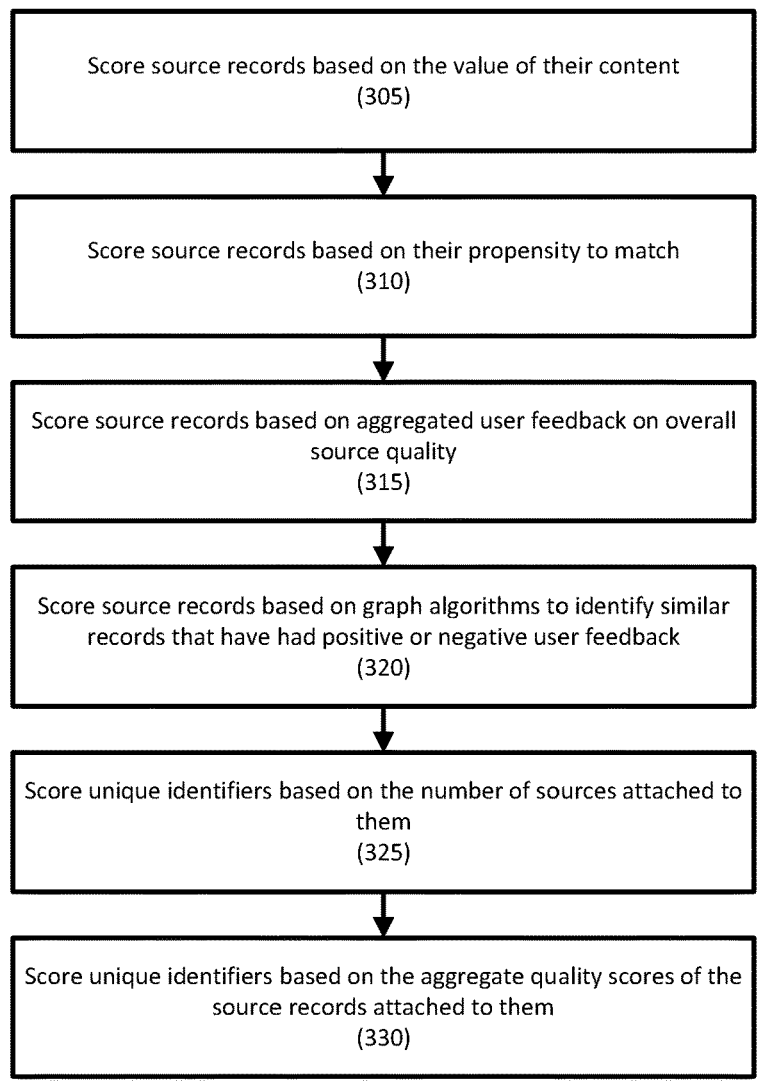
FIG. 3 depicts a method of quality scoring of unique identifiers is provided according to embodiments.

Referring to FIG. 3, a method of quality scoring of unique identifiers is provided according to embodiments. The quality score may represent a confidence level that the unique identifier is associated with the proper company, contact, and/or property. The quality score may be based on a plurality of factors, including the value of the information provided from a source, the propensity of the source records from the source to match, direct user feedback on the quality score, indirect (e.g., predicted) feedback from a trained machine learning engine, and the number of data sources that provide records for the unique identifier.

In step 305, a quality scoring computer program may score source records from the data sources based on the value of the content they provide. This component of the quality score may indicate whether a source record has valuable information. In one embodiment, the quality scoring computer program may retrieve records from each source and may compare the contents of the records to an indicated objective for the data source. For example, if the data source was selected to provide mergers and acquisitions records, the score may be based on the percentage of records from the data source that include mergers and acquisitions information.

Each source may have a specialized program to evaluate its source records based on quality expectations as the expectations and means for determining their satisfaction are different for each source.

The score may be any suitable value, such as a numeric value (e.g., 0.0 to 1.0, 1-3, 1-5, 1-10, etc.), a qualitative value (e.g., high-medium-low), etc. Any suitable scoring scheme may be used as is necessary and/or desired.

In step 310, the quality scoring computer program may score the source records based on their propensity to match a unique identifier. This component of the quality score may indicate whether a source record is likely to be describing a well-known entity. For example, the quality scoring computer program may retrieve records from each data source and may score the records based on whether the records can be associated with a company, a contact, or a property. The higher percentage of the match, the higher the quality score.

In one embodiment, a scoring scheme, such as that depicted in FIG. 4, may be used. For example, a record that has a perfect name, perfect address, and perfect zip code will have a higher confidence than a record that has a 75% match with name, 85% match with address, and a perfect zip code.

The score may also have any suitable value, such as a numeric value (e.g., 0.0 to 1.0, 1-3, 1-5, 1-10, etc.), a qualitative value (e.g., high-medium-low; very high, high, insufficient; etc.), etc. Any suitable scoring scheme may be used as is necessary and/or desired.

In step 315, quality scoring computer program may score the source records based on direct user feedback on overall source quality. Direct user feedback from a plurality of users for source records may be aggregated. This component of the quality score may indicate whether the source of the record has shown a general level of quality.

The score may also have any suitable value, such as a numeric value (e.g., 0.0 to 1.0, 1-3, 1-5, 1-10, etc.), a qualitative value (e.g., high-medium-low), etc. Any suitable scoring scheme may be used as is necessary and/or desired.

In step 320, the quality scoring computer program may score the source records based on graph algorithms to identify similar records that have had positive or negative user feedback. In one embodiment, the direct feedback received from the users may be used to train a machine learning algorithm to predict the quality of a record. For example, machine learning may be used to recognize patterns (positive or negative) in the user feedback to find records that users have not reviewed but exhibit similar characteristics to records they have reviewed.

The score may also have any suitable value, such as a numeric value (e.g., 0.0 to 1.0, 1-3, 1-5, 1-10, etc.), a qualitative value (e.g., high-medium-low), etc. Any suitable scoring scheme may be used as is necessary and/or desired.

In step 325, the quality scoring computer program may score the unique identifiers based on the number of sources attached to them. This component of the quality score may indicate the reliability of the unique identifier. For example, a unique identifier that has received records from multiple sources may be assigned a higher score than a unique identifier that has received records from only one source as this indicates the presence of the underlying information in multiple different data sources.

The score may also have any suitable value, such as a numeric value (e.g., 0.0 to 1.0, 1-3, 1-5, 1-10, etc.), a qualitative value (e.g., high-medium-low), etc. Any suitable scoring scheme may be used as is necessary and/or desired.

In step 330, the quality scoring computer program may score unique identifiers based on the aggregate quality scores of the source records attached to them. For example, a company may have a unique identifier, and source A and source B mapped to the unique identifier for the company. Source records A and B will have individual quality scores, the unique identifier for the company will have a quality score based on having only two sources attached to it instead of ten.

The overall quality of the data associated with unique identifier for the company may be a composite of the source record scores and the score based on how many sources are attached.

In one embodiment, a machine learning algorithm may assign a weight to each of the scores (e.g., the first score, the second score, etc.) based on feedback on the overall quality scores.

Figure 5:
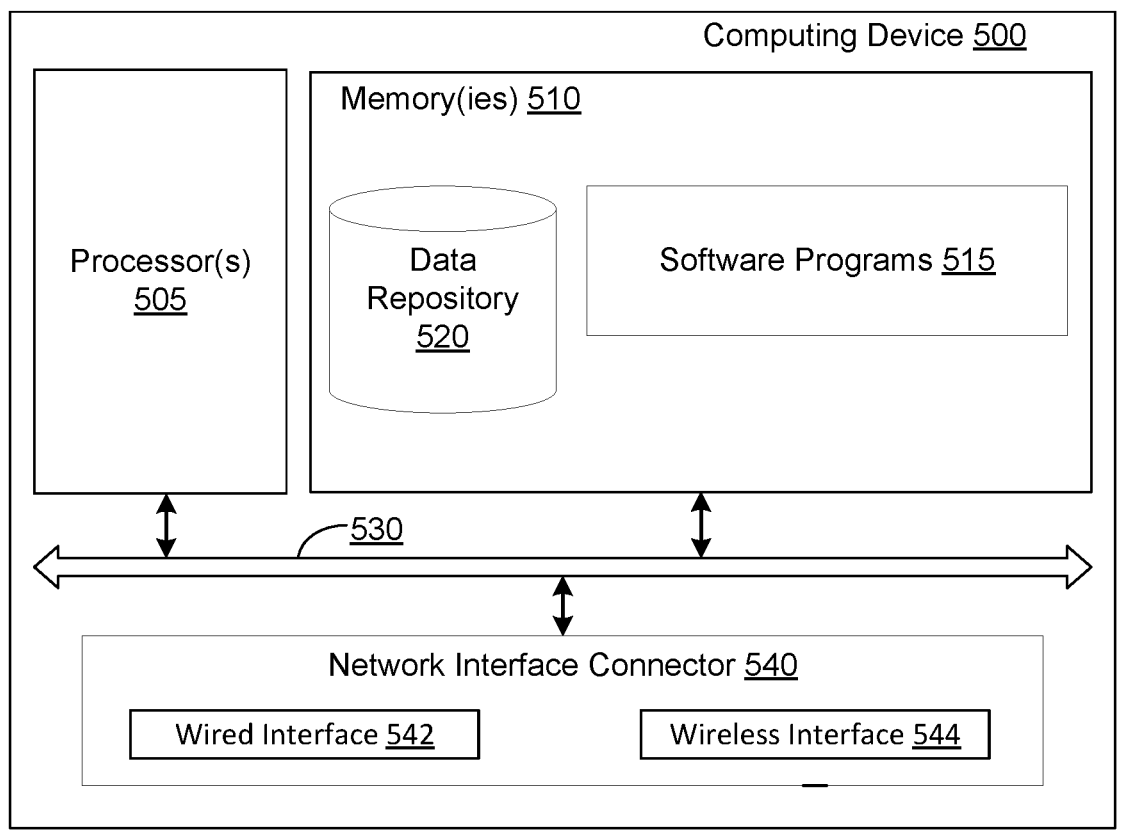
FIG. 5 depicts an exemplary computing system for implementing aspects of the present disclosure.

FIG. 5 depicts an exemplary computing system for implementing aspects of the present disclosure. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530.

Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for matching organizations to unique identifiers and managing the unique identifiers, comprising:

ingesting, by a company matching computer program, a plurality of records from a plurality of data sources;

identifying, by the company matching computer program, a company associated with each of the plurality of records;

assigning, by the company matching computer program, a unique identifiers to each uniquely identified company;

matching, by the company matching computer program, each of the plurality of records to one of the uniquely identified companies using a trained company matching machine learning engine, the trained company matching machine learning engine being trained on a matching record truth set;

identifying, by the company matching computer program, a primary company record in the matching records and associating other matching records with the primary company record;

matching, by a contact matching computer program, each of the plurality of records to a contact using a trained contact matching machine learning engine, the trained contact matching machine learning engine being trained on a matching contact truth set;

identifying, by the contact matching computer program, a primary contact record in the matching records and associating other matching records with the primary contact record;

generating, by an identity management computer program, a graph database using the unique identifiers as lattice work comprising information about a connection of the unique identifiers and the plurality of records;

receiving, by the company matching computer program, the contact matching computer program, and the identity management computer program, feedback on the matching companies, and matching contacts;

updating, by the identity management computer program, the graph database based on a quality assessment by a quality scoring computer program, the quality assessment comprising a number of matched independent sources;

updating, by the identity management computer program, the graph database based on the feedback on the matching companies and matching contacts;

updating, by the identity management computer program, the graph database based on a reliability of the plurality of data sources;

updating, by the company matching computer program, the trained company matching machine learning engine, and updating, by the contact matching computer program, the trained contact matching machine learning engine; and generating, by a user interface executed on a computing device and in operative communication with the identity management computer program, a display of the graph database and a feedback interface.

2. The method of claim 1, wherein the plurality of data sources comprise proprietary data sources, structured public data sources, unstructured public data sources, and third party data sources.

3. The method of claim 1, wherein the company matching computer program identifies each company based on a company name, a company address, a company identifier, and a company uniform resource locator.

4. The method of claim 1, wherein the step of assigning the unique identifier to each uniquely identified company comprises:

determining, by the company matching computer program, that the uniquely identified company has not been assigned the unique identifier;

generating, by the company matching computer program, the unique identifier for the uniquely identified company; and storing, by the company matching computer program, an association between the unique identifier and the uniquely identified company.

5. The method of claim 1, wherein the company matching computer program matches each of the plurality of records to one of the uniquely identified companies using Locality Sensitive Hashing (LSH).

6. The method of claim 1, wherein the company matching computer program identifies the primary company record and the primary contact record based on an ownership hierarchy of the record.

7. The method of claim 1, wherein the company matching computer program identifies the primary company record and the primary contact record based on a likelihood of matching records from the plurality of sources.

8. The method of claim 1, further comprising:

matching, by a property matching computer program, each of the plurality of records to a property using a trained property matching machine learning engine; and identifying, by the contact matching computer program, a primary property record in the matching records and associating other matching records with the primary property record.

9. A method for quality scoring unique identifiers, comprising:

receiving, by a quality scoring computer program, source records from each of a plurality of data sources;

scoring, by the quality scoring computer program, each of the source records based on a value of content in the source records, resulting in a first score that indicates whether the source record has valuable information;

scoring, by the quality scoring computer program, the source records based on a propensity to match a unique identifier, resulting in a second score that indicates whether the source record is describing a well-known entity;

scoring, by the quality scoring computer program, the source records based on direct user feedback, resulting in a third score that indicates whether the source of the record has shown a general level of quality;

scoring, by the quality scoring computer program, the unique identifiers based on a number of different data sources attached to each unique identifier, resulting in a fourth score that indicates a reliability of the unique identifier;

aggregating, by the quality scoring computer program, the first score, the second score, the third score, and the fourth score;

outputting, by the quality scoring computer program, the aggregated scores;

generating, by an identity management computer program, a graph database using the unique identifiers as lattice work comprising information about a connection of the unique identifiers, the source records, and the aggregated scores;

generating, by a user interface executed on a computing device and in operative communication with the identity management computer program, a display of the graph database and a feedback interface; and determining, by a machine learning engine in operative communication with the identity management program, a pattern of feedback of the aggregated scores received through the feedback interface and updating the aggregated scores based on a prediction of the aggregated scores based on the pattern of feedback.

10. The method of claim 9, wherein the third score is based on the source record matching a name, an address, and a zip code in one of the unique identifiers.

11. The method of claim 9, further comprising:

identifying, by the quality scoring computer program, one of the source records with direct feedback that is similar to one of the source records that does not have direct user feedback; and assigning the source record that does not have direct user feedback with similar user feedback as the identified source record.

12. The method of claim 9, further comprising:

assigning, by the quality scoring computer program, a weight to each of the first score, the second score, the third score, and the fourth score based on feedback received on the aggregated scores.

13. A non-transitory computer readable storage medium, including instructions stored thereon, which when read and executed by one or more computer processors, cause the one or more computer processors to perform steps comprising:

ingesting, by a company matching computer program, a plurality of records from a plurality of data sources;

identifying, by the company matching computer program, company associated with each of the plurality of records;

assigning, by the company matching computer program, a unique identifier to each uniquely identified company;

matching, by the company matching computer program, each of the plurality of records to one of the uniquely identified companies using a trained company matching machine learning engine, the trained company matching machine learning engine being trained on a matching record truth set;

identifying, by the company matching computer program, a primary company record in the matching records and associating other matching records with the primary company record;

matching each of the plurality of records to a contact using a trained contact matching machine learning engine, the trained contact matching machine learning engine being trained on a matching contact truth set;

identifying a primary contact record in the matching records and associating other matching records with the primary contact record;

generating, by an identity management computer program, a graph database using the unique identifiers as lattice work comprising information about a connection of the unique identifiers and the plurality of records;

receiving, by an identity management computer program, the contact matching computer program and the identity management computer program, feedback on the matching companies and matching contacts;

updating, by the identity management computer program, the graph database based on a quality assessment by a quality scoring computer program, the quality assessment comprising a number of matched independent sources;

updating, by the identity management computer program, the graph database based on the feedback on the matching companies and matching contacts;

updating, by the identity management computer program, the graph database based on a reliability of the plurality of data sources;

updating, by the company matching computer program, the trained company matching machine learning engine, and updating, by the contact matching computer program, the trained contact matching machine learning engine; and generating, by a user interface executed on a computing device and in operative communication with the identity management computer program, a display of the graph database and a feedback interface.

14. The non-transitory computer readable storage medium of claim 13, wherein the plurality of data sources comprise proprietary data sources, structured public data sources, unstructured public data sources, and third party data sources.

15. The non-transitory computer readable storage medium of claim 13, wherein each company is identified based on a company name, a company address, a company identifier, and a company uniform resource locator.

16. The non-transitory computer readable storage medium of claim 13, further including instructions stored thereon, which when read and executed by one or more computer processors, cause the one or more computer processors to:

determine that the uniquely identified company has not been assigned the unique identifier;

generate the unique identifier for the uniquely identified company; and store an association between the unique identifier and the uniquely identified company.

17. The non-transitory computer readable storage medium of claim 13, wherein each of the plurality of records is matched to one of the uniquely identified companies using Locality Sensitive Hashing (LSH).

18. The non-transitory computer readable storage medium of claim 13, wherein the primary company record and the primary contact record is identified based on an ownership hierarchy of the record.

19. The non-transitory computer readable storage medium of claim 13, wherein the primary company record and the primary contact record is identified based on a likelihood of matching records from the plurality of sources.

20. The non-transitory computer readable storage medium of claim 13, further including instructions stored thereon, which when read and executed by one or more computer processors, cause the one or more computer processors to:

match each of the plurality of records to a property using a trained property matching machine learning engine; and identify a primary property record in the matching records and associating other matching records with the primary property record.

* * * * *